US006614650B2

(12) United States Patent
Tabata

(10) Patent No.: US 6,614,650 B2
(45) Date of Patent: Sep. 2, 2003

(54) PORTABLE TERMINAL APPARATUS

(75) Inventor: Taichi Tabata, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 10 days.

(21) Appl. No.: 10/091,671

(22) Filed: Mar. 5, 2002

(65) Prior Publication Data

US 2002/0127977 A1 Sep. 12, 2002

(30) Foreign Application Priority Data

Mar. 6, 2001 (JP) .................................... P 2001-062001

(51) Int. Cl.$^{7}$ .................................................. G06F 1/16

(52) U.S. Cl. ....................... 361/681; 361/764; 455/347; 349/65

(58) Field of Search ................................ 361/681–683, 361/685, 687, 761, 764; 455/90, 347; 349/58, 65; 364/708.1; 382/312

(56) References Cited

U.S. PATENT DOCUMENTS 5,691,880 A * 11/1997 Seto et al. .................. 361/681
5,815,225 A * 9/1998 Nelson ....................... 349/665
6,023,414 A * 2/2000 Fujii .......................... 361/761
6,084,990 A * 7/2000 Suzuki et al. ............... 382/312
2002/0127977 A1 * 9/2002 Tabata ........................ 455/90

FOREIGN PATENT DOCUMENTS

JP 6-326658 11/1994

* cited by examiner

*Primary Examiner*—Darren Schuberg
*Assistant Examiner*—Hung Van Duong
(74) *Attorney, Agent, or Firm*—Pearne & Gordon LLP

(57) ABSTRACT

This invention provides a portable terminal apparatus increasing brightness at a light emitting portion of the portable terminal apparatus. Light emitted from a light source is made to be incident from an engaging portion of a conducted light emitting portion and is diffused at inside of the conducted light emitting portion. The diffused light is reflected by surfaces of a bottom face portion and side face portions and of a recessed portion, the reflected light is further diffused and emitted by a conducted light emitting member at a vicinity of a surface of the recessed portion and therefore, brightness of the conducted light emitting portion at the vicinity of the recessed portion can be increased.

9 Claims, 4 Drawing Sheets

PORTABLE TERMINAL APPARATUS

BACKGROUND OF THE INVENTION

1. Field of the Invention

The present invention relates to a light emitting portion provided to a portable terminal apparatus of a portable cellular phone, a portable personal computer or the like.

2. Description of the Related Art

As a conventional example of a portable terminal apparatus including a light emitting portion, there is disclosed a folding type portable telephone including a signal arrival lamp as an light emitting portion in Japanese Patent Laid-Open No. Hei. 6-326658.

According to the folding type portable telephone, a receiving portion and a transmitting portion are pivotably connected with each other through a hinge. A rod antenna is extendably provided on the receiving portion. Furthermore, an ear piece is provided at an upper portion of a front face, a liquid crystal display is provided at a central portion of the front face, and a received sound volume adjusting button is provided at a side face thereof. Meanwhile, ten keys for dialing and function buttons are provided at a front face of the transmitting portion, further, a mouth piece is provided at a lower portion of the front face, and a power source switch and a signal arrival lamp are provided at a side face at a lower end thereof. Further, a battery pack is mounted to a rear side of the transmitting portion.

Further, the signal arrival lamp of the folding type portable telephone spans a face of the mouth piece and a face of the power source switch and lamp surfaces at the respective faces are flat.

Further, a light emitting portion of the conventional portable terminal apparatus is constituted by a light source and a light conducting portion for conducting light emitted from the light source and by providing to expose a portion of the light conducting portion on a housing surface portion of the portable terminal apparatus, light is emitted by emitting the light from the light source from an exposed face thereof.

However, when the light conducting portion is constituted by a conducted light emitting member, having light diffusing performance, at the light conducting portion (hereinafter, conducted light emitting portion), a difference of brightness may occur between a portion on which the light from the light source is incident and a portion remote from the light incident portion. The larger the conducted light emitting portion and the wider the area of the conducted light emitting portion, the more significantly the brightness difference emerges. FIGS. 8(*a*) and (*b*) illustrate enlarged views at a peripheral portion of a conducted light emitting portion when a signal arrival lamp is regarded as the conducted light emitting portion and a surface area thereof is enlarged while the surface remains to be flat.

FIGS. 8(*a*) and (*b*) illustrate the enlarged views of the peripheral portions of the conducted light emitting portion, FIG. 8(*a*) is a perspective view of the peripheral portion of the conducted light emitting portion and FIG. 8(*b*) is a top view of the peripheral portion of the conducted light emitting portion.

The conducted light emitting portion of the signal arrival lamp shown in FIGS. 8(*a*) and (*b*), is large-sized while the surface of the conducted light emitting portion remains to be flat and in FIG. 8(*b*), there is also shown a light source of the signal arrival lamp built in the portable terminal apparatus.

Further, light from the light source is emitted to the conducted light emitting portion and an outline brightness distribution at the conducted light emitting portion, is shown by contour lines of one-dotted broken lines. At a portion thereof near to the light source, the brightness is high. Meanwhile, at a portion thereof remote from the light source, the brightness is low.

Therefore, although a user of the portable terminal apparatus is informed of various alarms of signal arrival and the like by lighting the conducted light emitting portion, there is conceivable a problem that even when the above-described portion having high brightness of the conducted light emitting portion is assumedly concealed by some obstacle (finger, hand or the like) and the portion having low brightness is exposed, a user does not notice informing of signal arrival or the like since the brightness of the exposed portion is low.

Further, although it is conceivable to reduce the low brightness portion of the conducted light emitting portion by emitting light to the conducted light emitting portion by increasing a number of pieces of the light source, the increase in the light source not only increases fabrication cost of the portable terminal apparatus but constitutes a factor increasing power consumption of the portable terminal apparatus.

SUMMARY OF THE INVENTION

The invention has been carried out in view of such a situation and an object of the invention is to provide a portable terminal apparatus increasing brightness at a light emitting portion of a portable terminal apparatus.

In order to achieve the above object, the invention provides a portable terminal apparatus including a light emitting portion including a light source and a conducted light emitting portion for conducting and emitting light from the light source in a housing.

wherein the conducted light emitting portion includes a conducted light emitting member including a light diffusing agent and a recessed portion is provided at a face of the conducted light emitting portion exposed on a surface of the housing.

According to the portable terminal apparatus, the light from the light source is reflected by a surface of the recessed portion, the reflected light is further diffused and emitted by the conducted light emitting member at a vicinity of the surface of the recessed portion and therefore, brightness of the conducted light emitting portion at the vicinity of the recessed portion can be increased.

Therefore, when the recessed portion is provided at the conducted light emitting portion, a low brightness portion of the conducted light emitting portion is reduced (high brightness portion is increased) and accordingly, a user of the portable terminal apparatus easily recognizes informing of signal arrival or the like by illuminating.

Further, the low brightness portion of the conducted light emitting portion can be reduced without increasing a number of pieces of the light source.

The portable terminal apparatus of the invention is featured in that a surface of the recessed portion includes a surface portion having a projection of a height lower than a depth of the recessed portion.

According to the portable terminal apparatus, by providing the projection at the surface of the recess portion, the light from the light source is reflected by the projection. The reflected light is diffused and emitted by the conducted light emitting member at a vicinity of the projection and accordingly, brightness of the conducted light emitting portion at the vicinity of the projection can also be increased.

The portable terminal apparatus of the invention is characterized in that the surface of the recessed portion includes a surface portion in which a normal line of a face thereof and an optical axis of the light source form a predetermined angle other than 90°.

According to the portable terminal apparatus, the normal line of the surface portion and the optical axis of the light source form the predetermined angle other than 90°, an area of reflecting the light from the light source is widened and the light is diffused and emitted by the conducted light emitting member at the vicinity of the surface portion constituting the angle and therefore, brightness of the conducted light emitting portion at the vicinity of the surface portion constituting the angle can also be increased.

The portable terminal apparatus of the invention is characterized in further including a reflective film for reflecting the light from the light source to a side of an opposed face opposed to the exposed face of the conducted light emitting portion.

According to the portable terminal apparatus, the light emitted from the light source to the side of the opposed face, is reflected by the reflective film and therefore, brightness of the conducted light emitting portion can be increased.

The portable terminal apparatus of the invention is characterized in further including a printed layer which is colored or printed with a predetermined figure, which is a letter, a sign, a symbol or the like, between the reflective film and the conducted light emitting portion.

According to the portable terminal apparatus, in the case in which the printed layer between the reflective film and the conducted light emitting portion is a colored printed layer, when light reflected by the reflective film reaches an exposed face of the conducted light emitting portion, emitted light color at the exposed face becomes emitted light color in accordance with the colored color.

Further, when the printed layer between the reflective film and the conducted light emitting portion is a printed layer printed with characters or the like, the reflectivity differs between a printed portion and a non-printed portion and therefore, the printed portion can be made conspicuous.

The portable terminal apparatus of the invention is characterized in that the conducted light emitting portion includes an engaging portion engaged with the housing and the light from the light source is incident on the engaging portion.

According to the portable terminal apparatus, the light from the light source is made to be incident from the engaging portion and therefore, the incident light is further diffused at the engaging portion and the further diffused light can be emitted at the exposed face of the conducted light emitting portion.

The portable terminal apparatus of the invention is characterized in that the conducted light emitting portion is arranged to continuously span other surface of the housing in contact with a surface of the housing arranged with the conducted light emitting portion.

According to the portable terminal apparatus, the conducted light emitting portion continuously spans also the surface of other face in contact with the surface arranged with the conducted light emitting portion and therefore, the user can confirm a signal arrival state or the like also from the side of the other face (side face).

According to other aspect of the invention, the portable terminal apparatus is a portable terminal apparatus of a folding type including a first housing and a second housing connected via a hinge portion and pivotable to fold centering on an axis core of the hinge portion. In the portable terminal apparatus, the conducted light emitting portion is arranged at an area which is not covered by the second housing at an opposed face on a side of the first housing opposed to the second housing in a state of folding the two housings.

According to the portable terminal apparatus, even in the state of folding the two housings, an illuminating detecting portion can optically be recognized also from a side of an opposed face (rear face) opposed to an opposed face side of the second housing and therefore, a user can confirm a signal arrival state, a charge state or the like from the opposed face (rear face) side of the second housing.

BRIEF DESCRIPTION OF THE DRAWINGS

FIG. 2(*b*) is a top view of the peripheral portion of the light emitting portion.

FIG. 4(*b*) is a top view of the conducted light emitting portion of the second embodiment.

FIG. 5(*b*) is a sectional view of continuous projections in a semicircular shape.

FIG. 5(*c*) is a sectional view of continuous projections in a semicircular shape disposed upside down to the projections of FIG. 5(*b*).

FIG. 6(*b*) is a sectional view when projections are provided at a bottom portion of the conducted light emitting portion of the third embodiment.

FIG. 7(*b*) is a sectional view enlarging a recessed portion showing the fourth embodiment of the conducted light emitting portion.

FIG. 8(*b*) is a top view of the peripheral portion of the conducted light emitting portion.

DETAILED DESCRIPTION OF THE PREFERRED EMBODIMENTS

An explanation will be given of a portable terminal apparatus according to the invention in reference to FIGS. 1 through 3.

Figure 1:
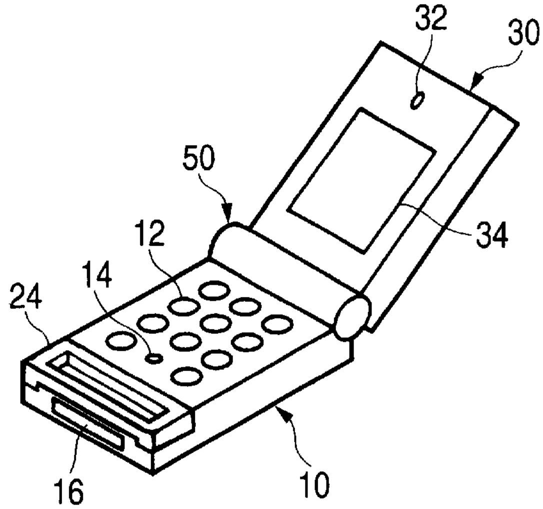
FIGS. 1(*a*) and (*b*) are perspective views of a portable terminal apparatus.
Figure 1:
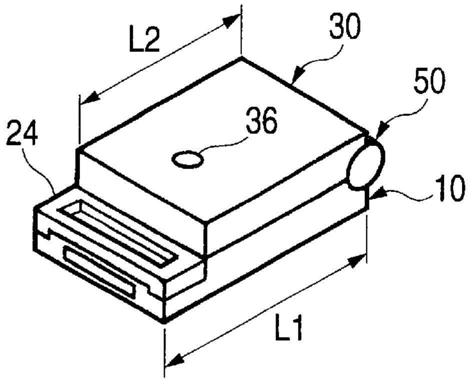
Figure 2:
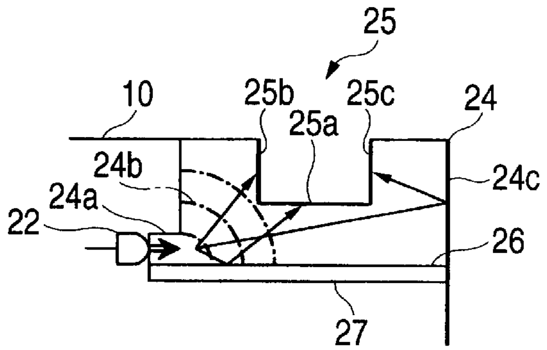
FIG. 2(*a*) is a sectional view of the peripheral portion of the light emitting portion of the portable terminal apparatus.
Figure 2:
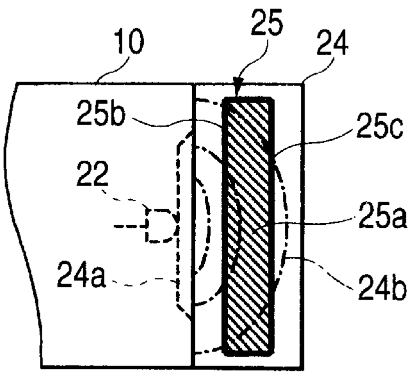
Figure 3:
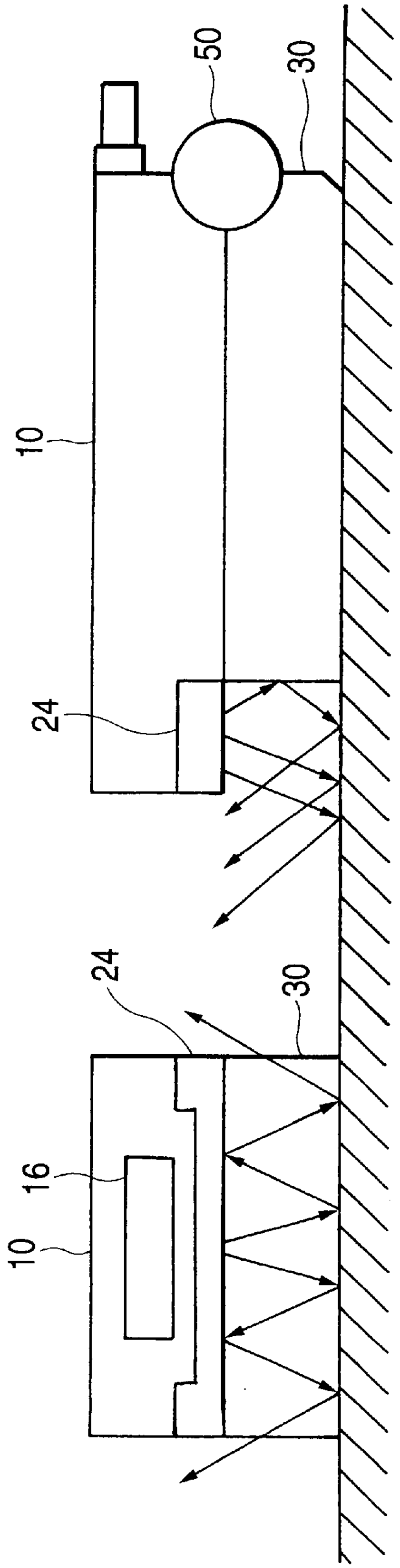
FIGS. 3(*a*) and (*b*) are side views of the portable terminal apparatus in a folded state.

FIGS. 1(*a*) and (*b*) illustrate perspective views of a portable terminal apparatus, FIGS. 2(*a*) and (*b*) show a sectional view and a top view of a peripheral portion of a light emitting portion of the portable terminal apparatus and FIGS. 3(*a*) and (*b*) illustrate side views of the portable terminal apparatus in a folded state.

An explanation will be given of the portable terminal apparatus according to the invention. The portable terminal apparatus is, for example, a folding type portable cellular phone and general outlook of the portable terminal apparatus is constituted by a lower housing 10 constituting a first housing, an upper housing 30 constituting a second housing and a hinge portion 50 as shown by FIGS. 1(*a*) and (*b*). Further, the hinge portion 50 is formed by respective housings of the lower housing 10 and the upper housing 30 and pivotably connects the lower housing 10 and the upper housing 30 to respectively fold centering on an axis core of the hinge portion 50.

Further, as shown by FIG. 1(*a*), when the portable terminal apparatus is brought into a state in which the lower housing 10 and the upper housing 30 are not folded to each other, that is, a state in which the lower housing 10 and the upper housing 30 are opened, faces of the lower housing 10 and the upper housing 30 opposed to each other (opposed faces) are exposed from each other. Meanwhile, when the lower housing 10 and the upper housing 30 are folded to each other as shown by FIG. 1(*b*), the opposed faces of the lower housing 10 and the upper housing 30 are brought into contact with each other or brought into a proximate state.

The outer shape of the lower housing 10 is constituted by substantially a box-like shape, the face opposed to the upper housing 30 is provided with a first operating portion 12 for operating the portable terminal apparatus and a transmitting portion 14 for speaking and a connector 16 is provided at an end face thereof opposed to the hinge portion 50 and a conducted light emitting portion 24 of a light emitting portion 20 is provided at an end portion thereof of the lower housing 10 on the side of the connector 16.

The operating portion 12 is a unit for carrying out operation or input to the portable terminal apparatus and is constituted by keys of, for example, ten keys, function keys and the like. A predetermined figure, which is a letter, sign, numerals, symbols and the like, is printed on surfaces of the keys and in operating the keys, and the respective keys may be illuminated by a backlight, not illustrated.

The transmitting portion 14 is a unit for converting voice into an electric signal and is a unit for inputting voice to the so-to-speak portable cellular phone.

The connector 16 is a unit for connecting to a connector of an external apparatus, not illustrated, and can connect to an external antenna and communicate a voice signal, an image signal or the like with the external apparatus. Further, power source can be supplied from an external power source, not illustrated, to the portable terminal apparatus and a battery pack, not illustrated, built in the portable terminal apparatus can also be charged therefrom by way of the connector 16.

Next, an explanation will be given of the light emitting portion 20 in reference to FIGS. 2(*a*) and (*b*). FIG. 2(*a*) is a sectional view of a peripheral portion of the light emitting portion of the portable terminal apparatus and FIG. 2(*b*) is a top view of the peripheral portion of the light emitting portion.

The light emitting portion 20 is constituted by a light source 22 and the conducted light emitting portion 24 for informing a state of the portable terminal apparatus by emitting light when a signal arrives at the portable terminal apparatus or when the battery pack is charged in a state of being mounted to the portable terminal apparatus.

In details, the light is emitted from the conducted light emitting portion 24 exposed on the surface of the lower housing 10 by emitting light from the light source 22 to the conducted light emitting portion 24 and diffusing the emitted light at the conducted light emitting portion 24.

The light source 22 is a light emitting device, for example, a light emitting diode and an optical axis of the light emitting diode (a double line arrow mark in FIG. 2(*a*)) is directed to the engaging portion 24*a* of the conducted light emitting portion 24. Further, the light emitting diode is connected to an electric circuit, not illustrated, to thereby control illuminating.

The conducted light emitting portion 24 is molded by a resin of, for example, acrylic resin or the like, the resin includes a light diffusing agent and constitutes, for example, a conducted light emitting member in milky white color having light diffusing performance.

Further, the conducted light emitting portion 24 is provided with the engaging portion 24*a* constituting a portion of the conducted light emitting portion 24 and is fixedly engaged with the lower housing 10 by the engaging portion 24*a*.

Further, the faces of the conducted light emitting portion 24 exposed on the surface of the lower housing 10, forms a surface portion of the portable terminal apparatus along with the surface of the lower housing 10. Further, an exposed surface portion of the light emitting portion 24, is formed to span the opposed face as well as three side faces in contact with (intersected with) the opposed face of the lower housing 10. (refer to FIGS. 1(*a*) and (*b*))

Further, the exposed surface portion of the conducted light emitting portion 24, is formed with a recessed portion 25. As shown by FIG. 1(*b*), the recessed portion 25 is a groove substantially in a rectangular shape when viewed from the upper face. The recessed portion 25 is constituted by a substantially flat bottom face portion 25*a*, a side face portion 25*b* on the side of the light source 22 and a side face portion 25*c* opposed to the side face portion 25*b*.

Further, a printed layer 26 and a reflective film 27 are provided in this order between an opposed face side (in a lower direction of the conducted light emitting portion 24 of FIG. 2(*a*)) opposed to the exposed face of the conducted light emitting portion 24 and the lower housing 10.

The printed layer 26 is a printed layer which is colored or printed with characters, signs or the like. In the case in which the printed layer is a colored printed layer, when light reflected by the reflective film 27 reaches the exposed face of the conducted light emitting portion, emitted light color at the exposed face becomes emitted light color in accordance with color colored to the printed layer.

Further, when the printed layer is a printed layer printed with characters or the like, the reflectivity differs between a printed portion and a non-printed portion and therefore, the printed portion can be made conspicuous.

The reflective film 27 is a reflective film for reflecting light emitted from the light source 22. The light emitted from the light source 22 to the opposed face side of the conducted light emitting portion 24, is reflected by the reflective film and therefore, brightness of the conducted light emitting portion 24 can be promoted.

An explanation will be given as follows of a behavior of diffusing light emitted from the light source 22 by the conducted light emitting portion 24, the printed layer 26 and the reflective film 27 by the above-described constitution.

When the light from the light source 22 is firstly emitted to the engaging portion 24*a* of the conductive light emitting portion 24, since the conducted light emitting portion 24 is provided with the light diffusing agent, light is diffused to an inner portion thereof. An outline brightness distribution in the conducted light emitting portion 24, is designated by contour lines 24*b* of one-dotted broken lines. A portion thereof more proximate to the light source 22 is provided with higher brightness.

Light incident on a main body portion of the conducted light emitting portion 24 from the engaging portion 24*a,* is diffused in multiple directions. A behavior of light diffused in the multiple directions is shown by arrow marks in FIG. 2(*a*). For example, a certain flux of light directly reaches the side face portion 25*b* of the recessed portion 25 and a certain flux of light transmits the printed layer 26, is reflected by the reflective film 27, further transmits the printed layer 26 and reaches the bottom face portion 25*a* of the recessed portion 25. Further, a certain flux of light is partially reflected by an end face 24*c* of the conducted light emitting portion 24 and reaches the side face portion 25*c* of the recessed portion 25.

Further, light reaching the recessed portion 25, is partially reflected by the surface of the recessed portion 25 and diffused and emitted by the conducted light emitting member at a vicinity of the surface of the recessed portion 25. Therefore, brightness of the conducted light emitting portion 24 at the vicinity of the recessed portion 25 can be promoted. In FIG. 2(*a*), the side face portion 25*b,* the bottom face portion 25*a* and the side face portion 25*c* of the recessed portion 25 constituting the surface having high brightness, are designated by bold lines. Further, in FIG. 2(*b*), the side face portions 25*b* and 25*c* by which the recessed portion 25 is provided with high brightness, are shown by bold lines and the bottom face portion 25*a* is shown by hatched lines.

Further, since the recessed portion 25 is provided with high brightness in the conducted light emitting portion 24, a portion which has been a low brightness portion is reduced in the conducted light emitting portion 24. Therefore, the user of the portable terminal apparatus recognizes informing of signal arrival or the like by illuminating more easily since the high brightness portion is increased.

Next, an explanation will be given of the upper housing 30 and the hinge portion 50.

An outer shape of the upper housing 30 is constituted by substantially a box-like shape and a face thereof opposed to the lower housing 10, is provided with a receiving portion 32 for receiving speech and a display portion 34 for carrying out various displays with regard to the portable terminal apparatus and a rear face of the opposed face is provided with an operation button of a second operating portion 36.

The receiving portion 32 is a unit for outputting voice received in speech and the display portion 34 is a substantially a flat display unit for displaying characters, signs, numerals, images and the like and can optically be recognized from the opposed face side of the upper housing 30.

The second operating portion 36 can be operated since the second operating portion 36 is exposed even in a state of folding the portable terminal apparatus.

The hinge portion 50 is wound and stored with a flexible board (not illustrated) electrically connecting the unit at inside of the lower housing 10 and the unit at inside of the upper housing 30.

Therefore, the lower housing 10 and the upper housing 30 of the portable terminal apparatus are pivotably connected by the hinge portion 50 and further, the unit at inside of the lower housing 10 and the unit at inside of the upper housing 30 are electrically connected by the flexible board.

Next, an explanation will be given of sizes (lengths) and masses of the lower housing 10 and the upper housing 30.

When a length from the end face of the lower housing 10 on the side of the hinge portion 50 to the end face arranged with the connector 16, is designated by notation L1 and a length from the end face of the upper housing 30 on the side of the hinge portion 50 to other end face thereof, is designated by notation L2, L1 is longer than L2 (L1>L2).

Further, the conducted light emitting portion 24 of the light emitting portion 20 is arranged at an area of the opposed face of the lower housing 10 which is not covered by the upper housing 30 in the state of folding the portable terminal apparatus.

Therefore, even in the state of folding the portable terminal apparatus (FIG. 1(*b*)), in the L1 direction (length direction), the conducted light emitting portion 24 is exposed by an amount of a length (L1–L2) and therefore, a user can optically recognize the conducted light emitting portion 24 from a direction of a face opposed to the opposed face of the upper housing 30 (upper direction of the drawing).

Further, there is constructed a constitution in which weight of the lower housing 10 is heavier than weight of the upper housing 30 with the hinge portion 50 as a boundary. The lower housing 10 is mounted with the battery pack having comparatively large mass and therefore, the side of the lower housing 10 is heavier. Naturally, the lower housing 10 may be constituted to be heavier by containing a unit having weight other than the battery pack in the lower housing 10, or the lower housing 10 may be constituted to be heavier than the upper housing 30 by constituting a housing material of the lower housing 10 by a heavy material.

By such a weight balance of the lower housing 10 and the upper housing 30, when in the state of folding the two housings, a face of the lower housing 10 opposed to the opposed face is placed to the lower side (as shown by FIG. 1(*b*)), the gravitational center of the portable terminal apparatus is disposed to the lower side and therefore, the portable terminal apparatus can be placed stably and fixedly.

Next, an explanation will be given of a case in which in the state of folding the portable terminal apparatus, the portable terminal apparatus is placed on a desk by disposing a face opposed to the opposed face of the upper housing 30 on the lower side.

FIG. 3(*a*) is a side view viewed from the side of the connector 16 and FIG. 3(*b*) is a right side view.

In FIGS. 3(*a*) and (*b*), the face opposed to the opposed face of the lower housing 10 is directed upwardly, the conducted light emitting portion 24 is directed downwardly when viewed from the upper side and therefore, the conducted light emitting portion 24 is concealed by the lower housing 10, however, there is a stepped difference by the thickness of the lower housing 10 between the surface on the opposed face side of the conducted light emitting portion 24 (the exposed face of the conducted light emitting portion 24) and the face opposed to the opposed face of the lower housing 10 (face in contact with the desk) and therefore, the conducted light emitting portion 24 is not brought into close contact with the desk with a clearance between them.

Therefore, when informing is carried out by illuminating of the light emitting portion 20, light irradiated from the opposed face side of the conducted light emitting portion 24, is irradiated toward the desk, the irradiated light is reflected by the surface of the desk and the reflected light is directed to the side of the connector 16 (arrow marks of FIG. 3(*b*)) and sides of the left and right side faces (arrow marks of FIG. 3(*a*)) when viewed from the upper side of the drawing.

Therefore, even when the portable terminal apparatus is placed upside down as shown by FIGS. 3(*a*) and (*b*), a user can optically recognize the reflected light and therefore, informing by illuminating is achieved.

Next, an explanation will be given of the conducted light emitting portion and the recessed portion in other embodiment of the invention in reference to FIGS. 4 through 7.

Figure 4:
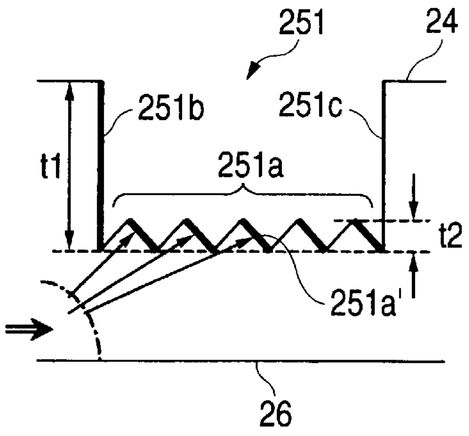
FIG. 4(*a*) is a sectional view of the conducted light emitting portion of the second embodiment.
Figure 4:
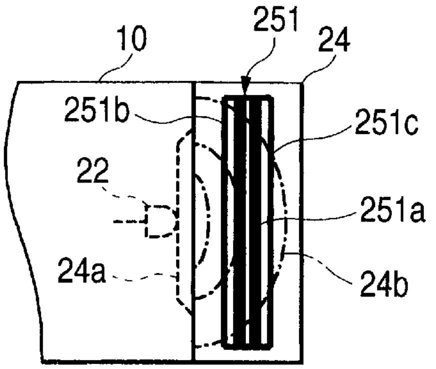
Figure 5:
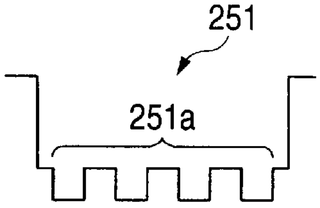
FIG. 5(*a*) is a sectional view of continuous projections substantially in a rectangular shape.
Figure 5:
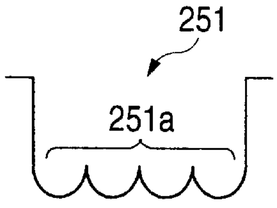
Figure 5:
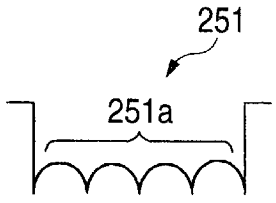
Figure 6:
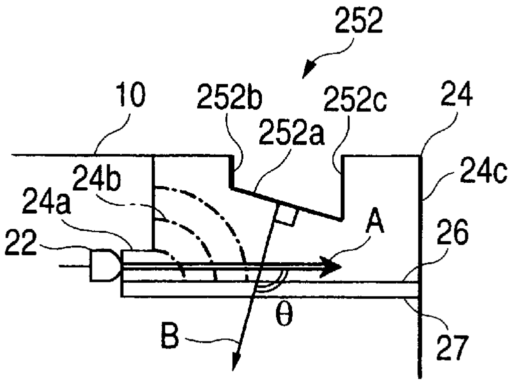
FIG. 6(*a*) is a sectional view of the conducted light emitting portion of the third embodiment.
Figure 6:
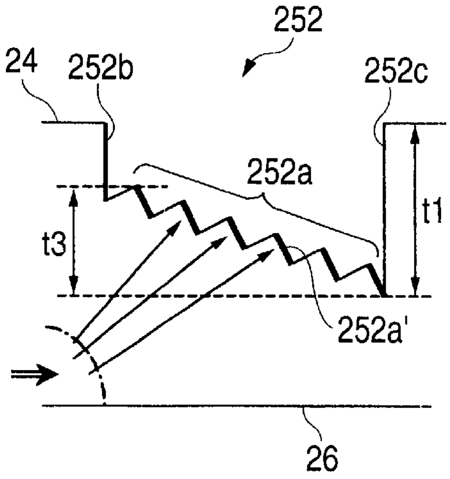
Figure 7:
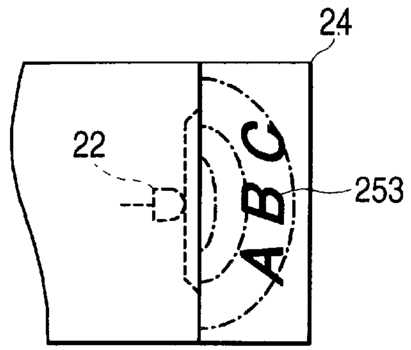
FIG. 7(*a*) is a top view showing the fourth embodiment of the conducted light emitting portion.
Figure 7:
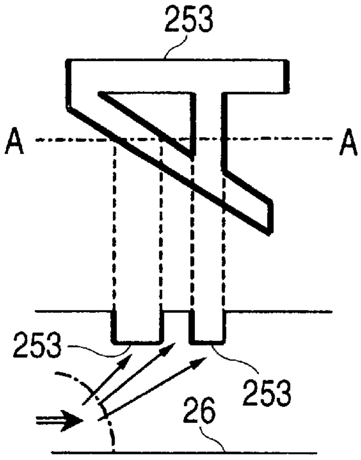
Figure 8:
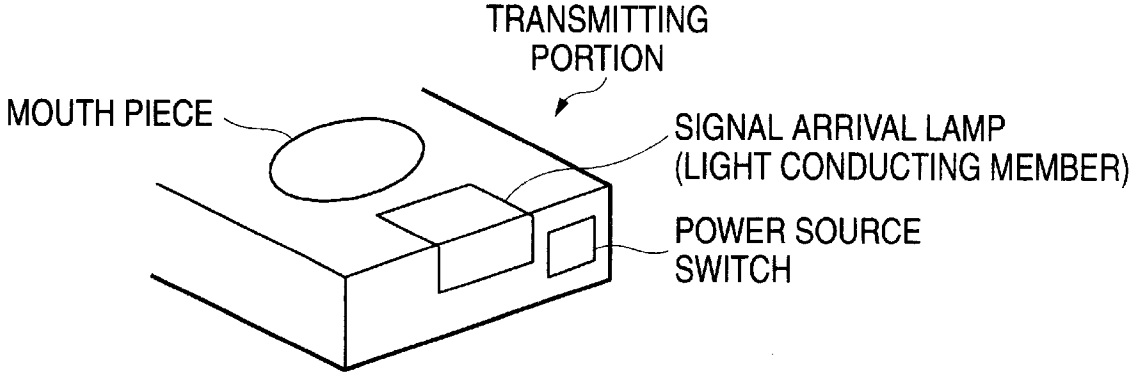
FIG. 8(*a*) is a perspective view of the peripheral portion of the conducted light emitting portion.
Figure 8:
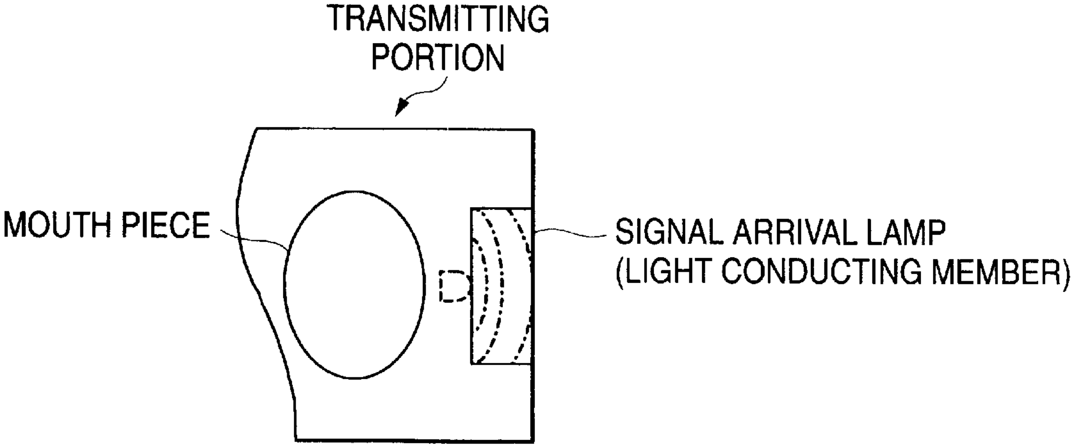

FIGS. 4(*a*) and (*b*) illustrate a sectional view and a top view showing a second embodiment of a conducted light emitting portion, FIGS. 5(*a*), (*b*), and (*c*) illustrate sectional views showing kinds of shapes of recesses and projections of recessed portions, FIGS. 6(*a*) and (*b*) illustrate sectional views showing a third embodiment of a conducted light emitting portion and FIGS. 7(*a*) and (*b*) illustrate a top view and a sectional view showing a fourth embodiment of a conducted light emitting portion.

(Second Embodiment)

FIG. 4(*a*) is a sectional view of a conducted light emitting portion according to a second embodiment and FIG. 4(*b*) is a top view of the conducted light emitting portion according to the second embodiment. A recessed portion 251 of the conducted light emitting portion 24 shown in FIGS. 4(*a*) and (*b*), is provided with projections at a bottom face portion thereof constituting a portion of the surface of the recessed portion.

The recessed portion 251 is constituted by a bottom face portion 251*a,* a side face portion 251*b* on the side of the light source 22 and a side face portion 251*c* opposed to the side face portion 251*b* and a surface of the bottom face portion 251*a* is continuously aligned with a plurality of pieces of grooves each having a section substantially in a triangular shape orthogonally to an optical axis direction. Further, a height t2 of the triangle of the bottom face portion 251*a* is lower than a depth t1 of the recessed portion 251 (t1>t2).

Further, when light emitted from the light source 22 to the engaging portion 24*a* is diffused, as shown by arrow marks of FIG. 4(*a*), the diffused light is partially reflected by a side portion 251*a'* of the triangle of the bottom face portion 251*a* and diffused and emitted by the conducted light emitting member at a vicinity of a surface of the side portion 251*a'*. Therefore, brightness of the conducted light emitting portion 24 at the vicinity of the side portion 251*a'* can be increased. In FIG. 4(*a*), the side portions 251*a'* and the side face portions 251*b* and 251*c* constituting surfaces having high brightness, are designated by bold lines. Further, in FIG. 4(*b*), the side face portions 251*b* and 251*c* constituting high brightness when the recessed portion 251 is viewed from the upper face, are designated by bold lines and the bottom face portion 251*a'* is designated by hatched lines.

Further, although a sectional shape of the projection of the above-described bottom face portion 251*a* is constituted by substantially the triangular shape, as shown by FIG. 5(*a*), the bottom face portion 251*a* may be constituted by continuous projections each having a substantially rectangular shape as in a rectangular wave and as shown by FIG. 5(*b*), the bottom face portion 251*a* may be constituted by continuous projections in a semicircular shape. Further, as shown by FIG. 5(*c*), the bottom face portion 251*a* may be constituted by continuous projections each in a semicircular shape disposed upside down to the projections shown in FIG. 5(*b*).

(Third Embodiment)

FIG. 6(*a*) is a sectional view of a conducted light emitting portion according to a third embodiment and FIG. 6(*b*) is a sectional view when projections are provided at a bottom face portion in the conducted light emitting portion according to the third embodiment. A recessed portion 252 of the conducted light emitting portion 24 shown in FIG. 6, is constituted by a bottom face portion 252*a,* a side face portion 252*b* on the side of the light source 22 and a side face portion 252*c* opposed to the side face portion 252*b* and a normal line B of the bottom face 252*a* and an optical axis A of the light source 22 form an angle θ other than 90°. That is, the bottom face portion 252*a* is not a face in parallel with the optical axis.

Therefore, an area of light diffused by the engaging portion 24*a* directly reflected by the bottom face portion 252*a,* is widened and the light is diffused and emitted by the conducted light emitting member at a vicinity of the bottom face portion 252*a* constituting the angle and therefore, brightness of the conducted light emitting portion at the vicinity of the bottom face portion 252*a* can be promoted.

Further, although the angle θ illustrated in FIG. 6(*a*) is larger than 90°, the angle θ may be smaller than 90°. In that case, the bottom face portion 252*a* is inclined to the side face portion 25*c* and therefore, light partially reflected by the end face 24*c* of the conducted light emitting portion 24, is directed to the bottom face portion 252*a* and diffused and emitted by the conducted light emitting member at the vicinity of the bottom face portion 252*a.*

Further, as shown by FIG. 6(*b*), projections may be provided along a surface of the bottom face portion 252*a.* The surface of the bottom face portion 252*a* is continuously aligned with a plurality of pieces of grooves each having a section substantially in a rectangular shape orthogonally to the optical axis direction. Further, a height t3 of a group of the triangles of the bottom face portion 252*a* is lower than a depth t1 of the recessed portion 252 (t1>t3).

In this case, the bottom face portion 252*a* is inclined as a whole and therefore, not only an area of reflecting diffused light from the light source 22 is increased but also an area of side portions 252*a'* for directly reflecting the diffused light is increased and therefore, an area of a portion having high brightness can further be increased.

(Fourth Embodiment)

FIG. 7(*a*) is a top view showing a fourth embodiment of a conducted light emitting portion and FIG. 7(*b*) is a sectional view enlarging a recessed portion showing the fourth embodiment of the conducted light emitting portion.

Although a recessed portion 253 is constituted by grooves, the recessed portion 253 is inscribed with a predetermined figure of, for example, alphabet when viewed from the upper face (refer to FIG. 7(*a*)). Further, FIG. 7(*b*) illustrates a top view enlarging a portion of, for example, "A" of the recessed portion 253 in a shape of characters and a sectional view taken along a line A—A thereof.

The recessed portion 253 is constituted by the grooves each having a section in a recessed shape. Therefore, light from the light source 22 is diffused, brightness of a side face portion and a bottom face portion of the groove of the recessed portion 253 is increased (shown by bold lines of FIG. 7(*b*)), further, brightness of portions of the predetermined figure is increased and therefore, a rate of recognizing the predetermined figure portions is increased. Further, the predetermined figure portions may be constituted by letters, characters, numerals, or signs other than alphabet.

The above described is an explanation with regard to the conducted light emitting portions and the recessed portions according to the second, the third and the fourth embodiments.

Further, in the light source 22 of the light emitting portion 20 according to the invention, a differentiation between signal arrival and charging may be displayed further clearly to the user by the recessed portion 25 having high brightness of the conducted light emitting portion 24 by making illuminating period differ between signal arrival and charging. Further, a state of use thereof may be informed to the user by the light emitting portion 20 not only in signal arrival or charging but also in receiving electronic mail or in speech.

According to the portable terminal apparatus, light from the light source is reflected by the surface of the recessed portion, the reflected light is diffused and emitted by the conducted light emitting member at the vicinity of the surface of the recess portion and therefore, the brightness of the conducted light emitting portion at the vicinity of the recessed portion can be promoted.

Therefore, when the recessed portion is provided at the conducted light emitting portion, the low brightness portion of the conducted light emitting portion is reduced and therefore, the user of the portable terminal apparatus easily recognizes informing of signal arrival or the like by illuminating.

Further, the low brightness portion of the conducted light emitting portion can be reduced without increasing a number of pieces of the light source.

What is claimed is:

1. A portable terminal apparatus comprising:

a first housing; and a light emitting portion provided in the first housing and including a light source and a conducted light emitting portion for conducting a light from the light source and emitting the conducted light;

wherein the conducted light emitting portion includes a conducted light emitting member containing a light diffusing agent, and wherein a surface of the conducted light emitting portion includes an exposed face having a recessed portion exposed on a surface of the first housing.

2. The portable terminal apparatus according to claim 1, wherein a surface of the recessed portion includes projections whose height is lower than a depth of the recessed portion.

3. The portable terminal apparatus according to claim 1, wherein a surface of the recessed portion includes a surface portion formed in such a manner that a normal line of the surface portion and an optical axis of the light source meet with each other at a predetermined angle other than 90°.

4. The portable terminal apparatus according to claim 1, further comprising:

a reflective film for reflecting the light from the light source and provided on a face opposed to the exposed face of the conducted light emitting portion.

5. The portable terminal apparatus according to claim 1, wherein the conducted light emitting portion includes an engaging portion engaged with the first housing, and wherein the light from the light source is incident on the engaging portion.

6. The portable terminal apparatus according to claim 1, wherein the conducted light emitting portion is arranged to continuously extend over at least two surfaces of the first housing.

7. The portable terminal apparatus according to claim 1, further comprising:

a hinge portion; and a second housing connected with the first housing through the hinge portion, wherein the first housing and the second housing are pivotable with respect to each other on an axis core of the hinge portion, and wherein the conducted light emitting portion is arranged at an area which is not covered by the second housing on a surface of the first housing opposed to the second housing in a state that the portable terminal apparatus is folded at the hinge portion.

8. The portable terminal apparatus according to claim 4, further comprising:

a colored layer provided between the reflective film and the conducted light emitting portion.

9. The portable terminal apparatus according to claim 4, further comprising:

a printed layer printed with a predetermined figure and provided between the reflective film and the conducted light emitting portion.

* * * * *